United States Patent [19]

Gold

[11] Patent Number: 5,498,472
[45] Date of Patent: Mar. 12, 1996

[54] NON-LAMINATED DIFFERENTIAL WIND BARRIER FABRICS AND GARMENTS

[75] Inventor: Danny Gold, Hong Kong, Hong Kong

[73] Assignee: Kombi Ltd., Essex Junction, Vt.

[21] Appl. No.: 81,400

[22] Filed: Jun. 22, 1993

[51] Int. Cl.$^6$ ............................. A41D 19/00; B32B 3/06; B32B 27/40

[52] U.S. Cl. .......................... 428/284; 428/102; 428/913; 2/158; 2/159; 2/167; 2/161.1

[58] Field of Search ..................... 428/284, 913, 428/424, 102; 112/16; 66/174; 2/159, 161 R, 158, 167

[56] References Cited

U.S. PATENT DOCUMENTS

| | | | |
|---|---|---|---|
| 4,733,413 | 3/1988 | Dykstra | 2/164 |
| 5,020,161 | 6/1991 | Lewis, Jr. et al. | 2/164 |
| 5,123,119 | 6/1992 | Dube | 2/168 |

Primary Examiner—James D. Withers
Assistant Examiner—Kathryne E. Shelborne
Attorney, Agent, or Firm—Aufrichtig Stein & Aufrichtig

[57] ABSTRACT

A wind blocking hand covering including a back portion of the hand covering formed of a sandwich of three layers of material joined by binding the three layers to each other along at least one seam. The first layer being an outer fleece layer, the second layer being a waterproof breathable layer and the third, inner layer, being adapted to contact the wearer's hand. A front portion of the hand covering formed of at least one layer of material adapted to cooperatively form a hand covering with the back portion of the hand covering when attached. Securing means for securing the back portion of the hand covering to the front portion of the hand covering to form a hand covering which is suitable for blocking wind from reaching at least the back portion of a wearer's hand. The wind blocking fabric for use in a hand covering includes a first layer of a fleece material. A second, intermediate layer of material, with the first surface of the second layer being adjacent to the first layer and a second surface of the second layer being on the opposite side of the second layer from the first surface. The second layer is formed of a waterproof, windproof and breathable membrane. A third layer of material is proximate to the second surface of the second layer. A binding selectively forms a wind resistant fabric from a sandwich of the first layer, second layer and third layer by securing these layers together along selected joined portions of each of the three layers. The binding extends through each of the three layers thereby forming a wind blocking fabric.

35 Claims, 5 Drawing Sheets

NON-LAMINATED DIFFERENTIAL WIND BARRIER FABRICS AND GARMENTS

BACKGROUND OF THE INVENTION

The invention is generally directed to a non-laminated differential wind barrier produced in garment constructions and in particular to fabrics and garments and particular gloves and mittens constructed from non-laminated differential wind barrier forming materials which are constructed so as to provide a suitable and effective wind barrier in connection with various garments and particularly hand covering garments such as gloves or mittens without excessive bulkiness and restrictive pressure.

In the past when manufacturers of gloves or mitten construction have desired to utilize a waterproof breathable member between layers of a fleece material as a wind barrier, it was necessary to utilize a lamination process in which sheets of fleece and waterproof breathable materials, such as GORE-TEX® sold by W. L. Gore & Associates or other similar materials.

Figure 1:
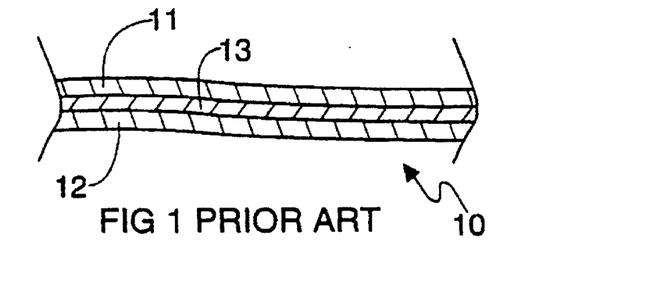
FIG. 1 is a cut off, cross-sectional view of a laminated wind blocking material in accordance with the prior art.

Reference is made to FIG. 1 in which a cross-sectional view of a prior art material wind block material generally indicated as 10 constructed in accordance with the prior art is depicted. Prior art fabric 10 is formed of fleece layers 11 and 12 sandwiching a waterproof breathable insert layer 13. The three layers are laminated together by laminating equipment which is known in the art. The lamination process is both expensive and of restrictive availability because of the high cost of the laminating material equipment.

Figure 2:
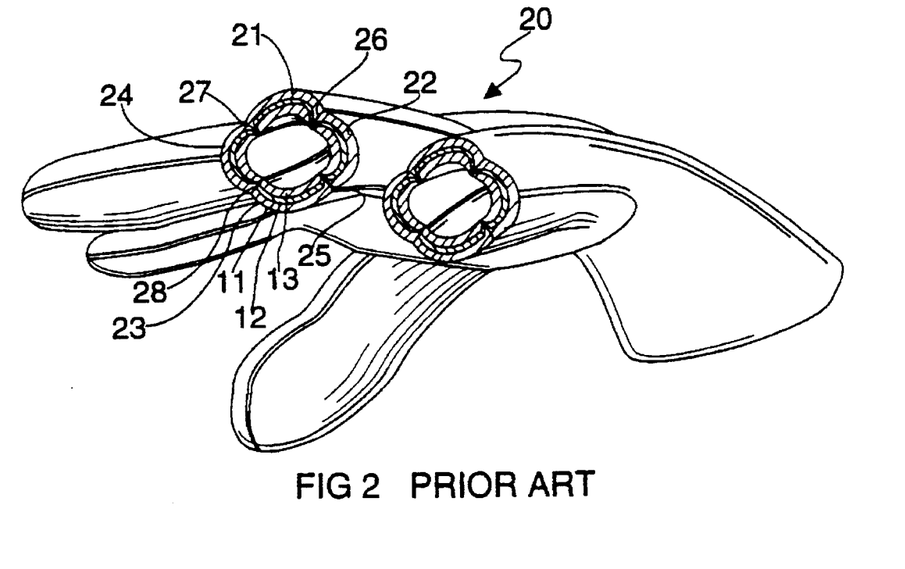
FIG. 2 is a perspective view of a glove with two of the fingers cut off to show a cross-sectional view of the fingers in accordance with the prior art.

Reference is made to FIG. 2 wherein a glove with two finger tips cut off constructed in accordance with conventional technology utilizing the laminated material 10 of FIG. 1 is depicted. Glove 20 is formed from distinct pieces of materials, each of which is formed of fabric 10. As shown in FIG. 2 a finger is formed of four separate pieces of the three layered laminated material at 10, each of which includes layers 11, 12 and 13 as described above. Each of the pieces denoted as 21, 22, 23 and 24 are joined by conventional seams indicated as 25, 26, 27 and 28 in accordance with the conventional stitching technology.

The laminated material must generally be manufactured by large fabric manufacturers in their plants which include the required laminating equipment and as a result there is a limited ability to use a series of different layered materials for different requirements within a glove. In addition, the material must be pre-ordered in the laminated state from the fabric manufacturer as the laminating equipment is generally too expensive for individual glove manufacturers to acquire and operate efficiently.

Thus, a glove manufacturer must estimate and order its laminated wind barrier fabric stock sometime in advance of its manufacture. Generally, then there are also problems when a laminated sandwich of the type shown in FIG. 1 is made. The insulating value of this sandwich is fairly limited based on the absence of any dead air spaces which increase its insulating capacity. Furthermore, generally in a glove construction what one desires is a greater protection against wind and cold on the back outside of the hand and a lesser degree of protection from wind and cold on the palm or inside of the hand and more flexibility on the inside. Where laminated sandwich material 10 is utilized, there will be the same flexibility and protection on both the outer and inner portion of the wearer's hand in any glove or mitten construction. This represents a trade off which, in addition to the cost and inconvenience of using of laminated materials further suggests the problem with a laminated material. Generally, the laminated sandwich 10 shown in FIG. 1 is also of increased cost due to the expensive laminating procedure generally followed.

Generally, there is a need in the wind barrier art for improved flexibility in creating differential wind barrier products out of multiple layers of construction materials including a generally waterproof and windproof breathable membrane sandwiched between layers of fleece or other construction materials adaptable depending upon location and use of the material within the glove or mitten construction and depending upon the intended use of the hand covering. There is also a need for flexibility in the construction of materials on an as needed basis from standard rolls or bolts of fleece, waterproof breathable membrane material and insulation as the need for assembling of the hand covering is implemented.

There is also a need for a glove or mitten assembly with a non-laminated differential wind barrier that creates the desired diversity of protection from cold and provides an augmented degree of insulation.

Accordingly, there is a need for an improved non-laminated differential wind barrier material and hand covering constructed from non-laminated differential wind barrier materials by creating work fabrics from sandwiches of waterproof breathable members between layers of fleece and/or other natural or synthetic fibers and insulation that are stitched together.

SUMMARY OF THE INVENTION

The invention is generally directed to a wind resistant hand covering, including a back portion of the hand covering formed of a sandwich of three layers of material joined by stitching the three layers to each other along at least two seams, the first layer being an outer fleece layer, the second layer being a waterproof breathable layer and the third, inner layer, being adapted to contact the wearer's hand. A front portion of the hand covering is formed of a sandwich of three layers of material joined by stitching the three layers to each other along these two seams, the first layer being an outer fleece layer, the second layer being waterproof, breathable layer and the third, inner layer, being adapted to contact the wearer's hands. Coupling means for securing the front portion of the hand covering to the back portion of the hand covering to form a wind resistant hand covering.

The invention is also generally directed to a wind resistant fabric for use in a hand covering. The hand covering includes a first layer of a fleece material and a second, intermediate layer of material with the first surface of the second layer being adjacent to the first layer, the second surface of the second layer being on the opposite side of the second layer from the first surface, the second layer being formed of a waterproof, breathable membrane. A third layer of material is proximate to the second surface of the second layer. A binding means selectively forms a wind resistant fabric from the sandwich of the first layer and the second layer and third layer by securing these three layers together along selected joined portions of each of the three layers, the binding means extending through each of the three layers so that a wind resistant fabric is formed.

Accordingly, it is an object of the invention to provide an improved non-laminated wind barrier fabric used in garments.

It is another object of the invention to provide an improved hand covering formed from non-laminated wind barrier fabrics.

A further object of the invention is to provided an improved non-laminated differential wind barrier fabric in hand garments to provide improved wind protection while maintaining flexibility as required.

Still another object of the invention is to provide an improved hand covering in which non-laminated differential wind barrier materials are used on different portions of the hand covering to provide more or less protection from wind and cold by selective variation and addition of layers.

Still other objects and advantages of the invention will in part be obvious and will in part be apparent from the specification.

The invention, accordingly, comprises the features of the construction, combinations of elements, and arrangements of parts which will be exemplified by constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 3:
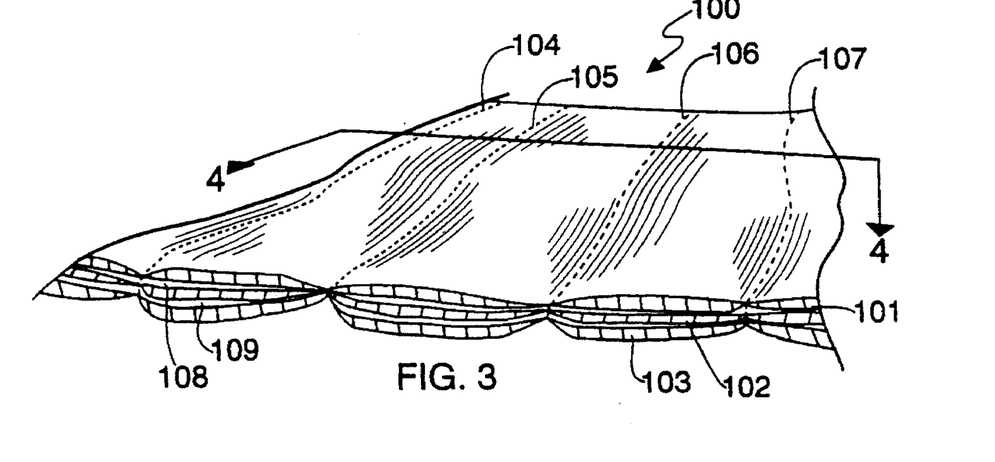
FIG. 3 is a partial side elevational view of a non-laminated wind blocking material constructed in accordance with a preferred embodiment of the invention.
Figure 4:
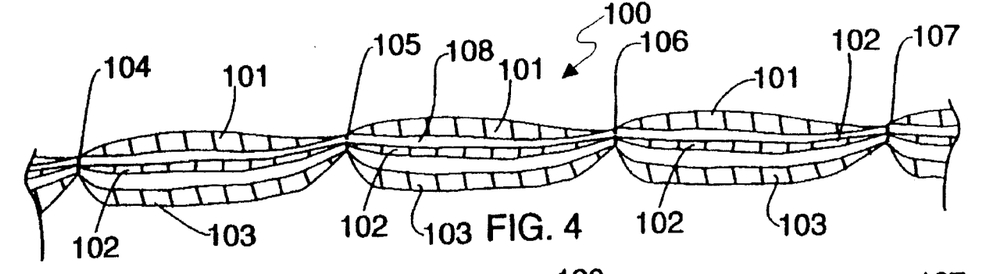
FIG. 4 is a cross-sectional view taken along line 4—4 of FIG. 3.

Reference is first made to FIGS. 3 and 4, wherein a non-laminated wind blocking fabric constructed in accordance with the invention, generally indicated as 100, is depicted. Fabric 100 is formed of first fleece layer 101, second waterproof, windproof and breathable layer 102 and fleece layer 103. Waterproof, windproof and breathable layer 102 can be formed of a variety of materials such as a PTFE membrane.

Layers 101, 102 and 103 are secured to each other by a series of stitched seams 104, 105, 106 and 107. The stitching produces a dead air space 108 between layers 101 and 102 and a dead air space 109 between layers 102 and 103. Dead air spaces 108 and 109 provide additional insulation value to the fabric where present.

Figure 5:
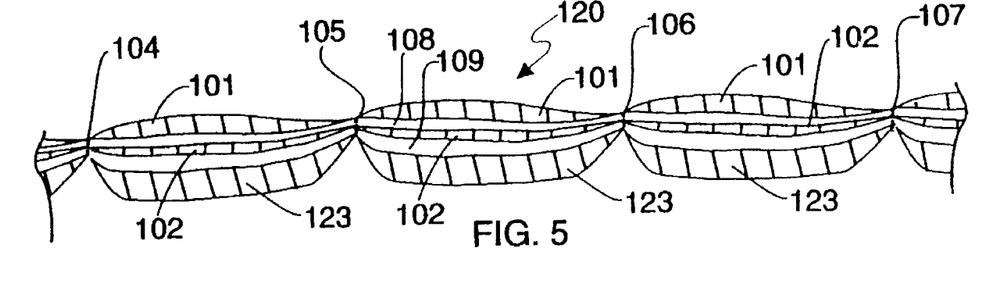
FIG. 5 is a cross-sectional view similar to FIG. 4 of a second non-laminated wind blocking material constructed in accordance with a preferred embodiment of the invention.

Reference is next made to FIG. 5 wherein a fabric generally indicated as 120 constructed in accordance with another embodiment of the invention is depicted, like reference numerals relate to like elements. Fabric 120 includes a light fleece layer 101, waterproof, windproof membrane 102 and a heavy outer fleece layer 123. Fabric 120 is sewn together with seams 104, 105, 106, 107 and, as in fabric 100 include dead air spaces 108, 109. This construction is useful in situations where additional wind and cold protection are required.

Figure 6:
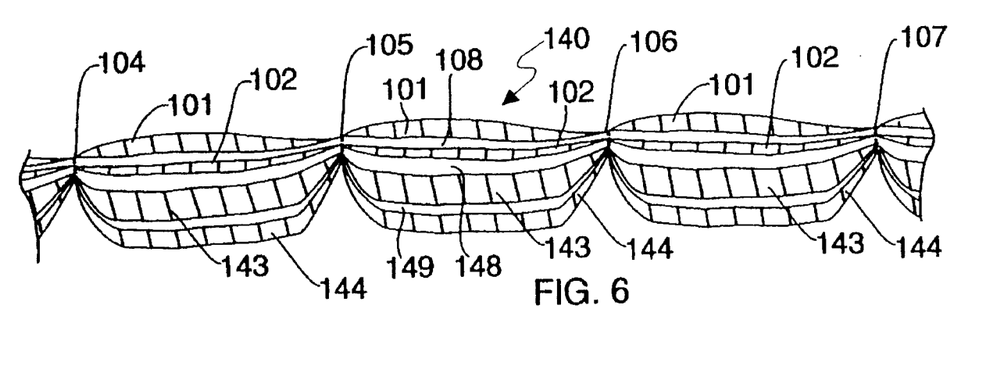
FIG. 6 is a cross-sectional view similar to FIG. 4 of a third non-laminated wind blocking material constructed in accordance with a preferred embodiment of the invention.

Reference is next made to FIG. 6 wherein a fabric generally indicated as 140 constructed in accordance with another preferred embodiment of the invention is depicted, like reference numerals corresponding to like elements. Fabric 140 includes fleece layer 101 and windproof and waterproof breathable membrane 102. However, fabric 140 includes an insulating 143 and a fleece layer 144. The four layers are held together by stitch seams 104, 105, 106 and 107. By using an additional insulating layer 143 between membrane layer 102 and a fleece layer 144, additional protection against the cold is provided. In addition, there is an additional dead air space provided. There is dead air space 108 between fleece layer 101 and membrane 102. A dead air space 148 is formed between membrane layer 102 and insulation layer 143. A third dead air space, 149, is formed between insulation layer 143 and fleece layer 144. The insulation layer may be a layer of wadding such as THINSULATE® or other insulating materials conventionally known in the art.

Fabrics 100, 120, 140 are shown as large scale sheets of fabric prepared for general use. However, rather than creating large sheets of materials, the desired layers of material may be cut into the required pattern shapes for garments such as a hand covering. In this way, there is additional flexibility and less wasted material. The smaller panel shaped sandwiches of materials may be joined by a single seam about the periphery of the panel, two seams along opposing edges or a series of regularly placed seams.

Figures 7, 8:
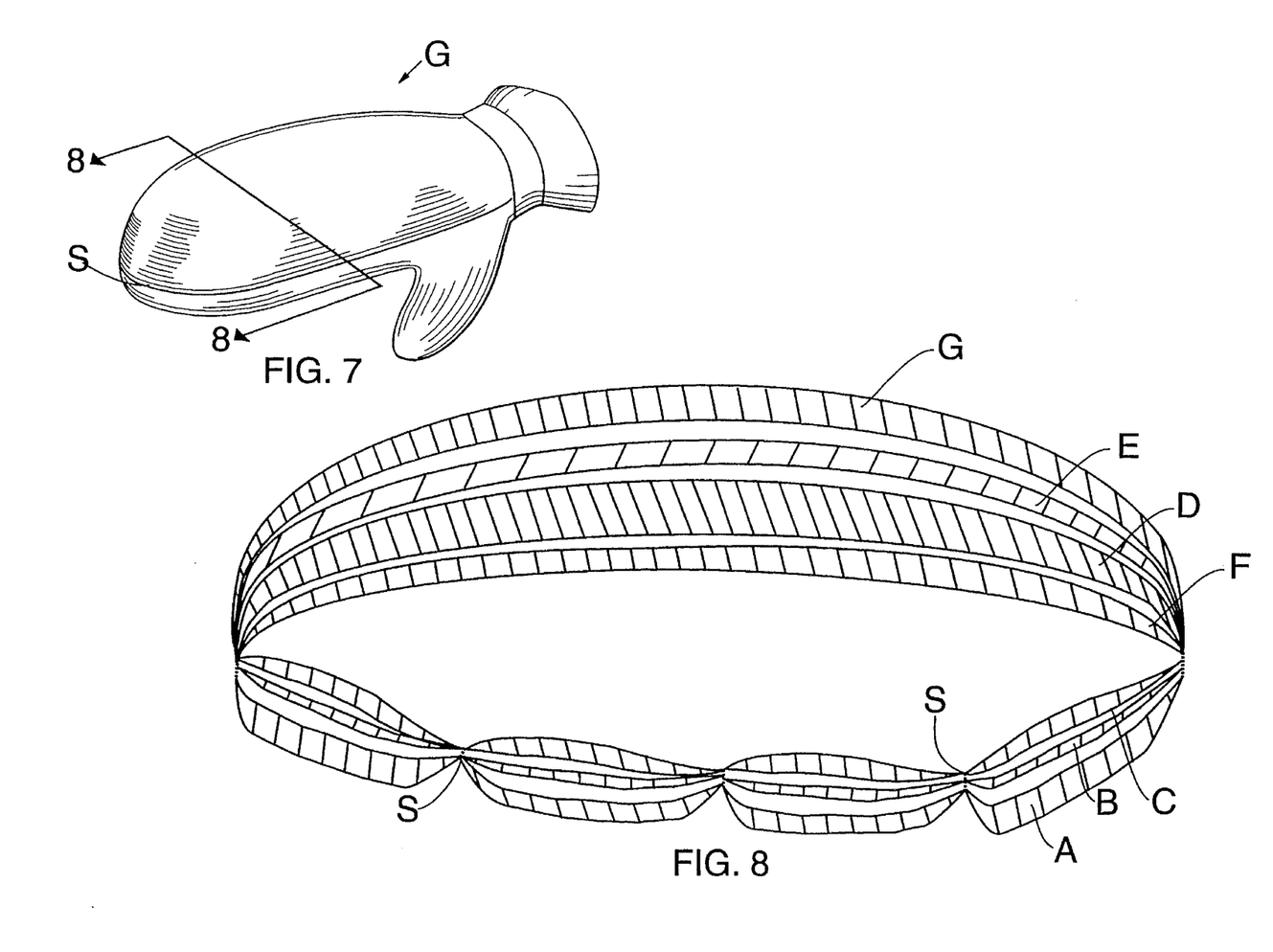
FIG. 7 is a perspective view of a mitten constructed of non-laminated differential wind blocking materials in accordance with a preferred embodiment of the invention.
FIG. 8 is a cross-sectional view taken along line 8—8 of FIG. 7.

Reference is next made to FIGS. 7 and 8 wherein a mitten generally indicated as 200, incorporating a non-laminated differential wind blocking materials is depicted. Mitten 200 includes a back portion 201 and a front or palm portion 202. As seen in the cross-sectional view of FIG. 8, back portion 201 includes fleece layer 203, membrane layer 204, insulating layer 205 and fleece layer 206. The four layers 203, 204, 205, 206, are secured by four stitched seams 207, 208, 209, 210. Stitched seams 207 and 208 are proximate the side edges of each of the layers of back portion 201. Seams 209 and 210 are intermediate seams which run along the middle portions of back portion 201.

Palm portion 202 of the mitten 200 includes the same layers as fabric 100 shown in FIG. 4. Layers 101, 102 and 103 are stitched together by seams 221 and 225, proximate the ends of palm portion 202. Seams 222, 223 and 224 are found generally spaced across the width of palm portion 202, between end seams 221 and 225 so as to create generally equally spaced baffles.

By the differential use of materials which are easily modified and created utilizing the stitched arrangement rather than sandwich construction, improved hand coverings can be easily constructed.

Figure 9:
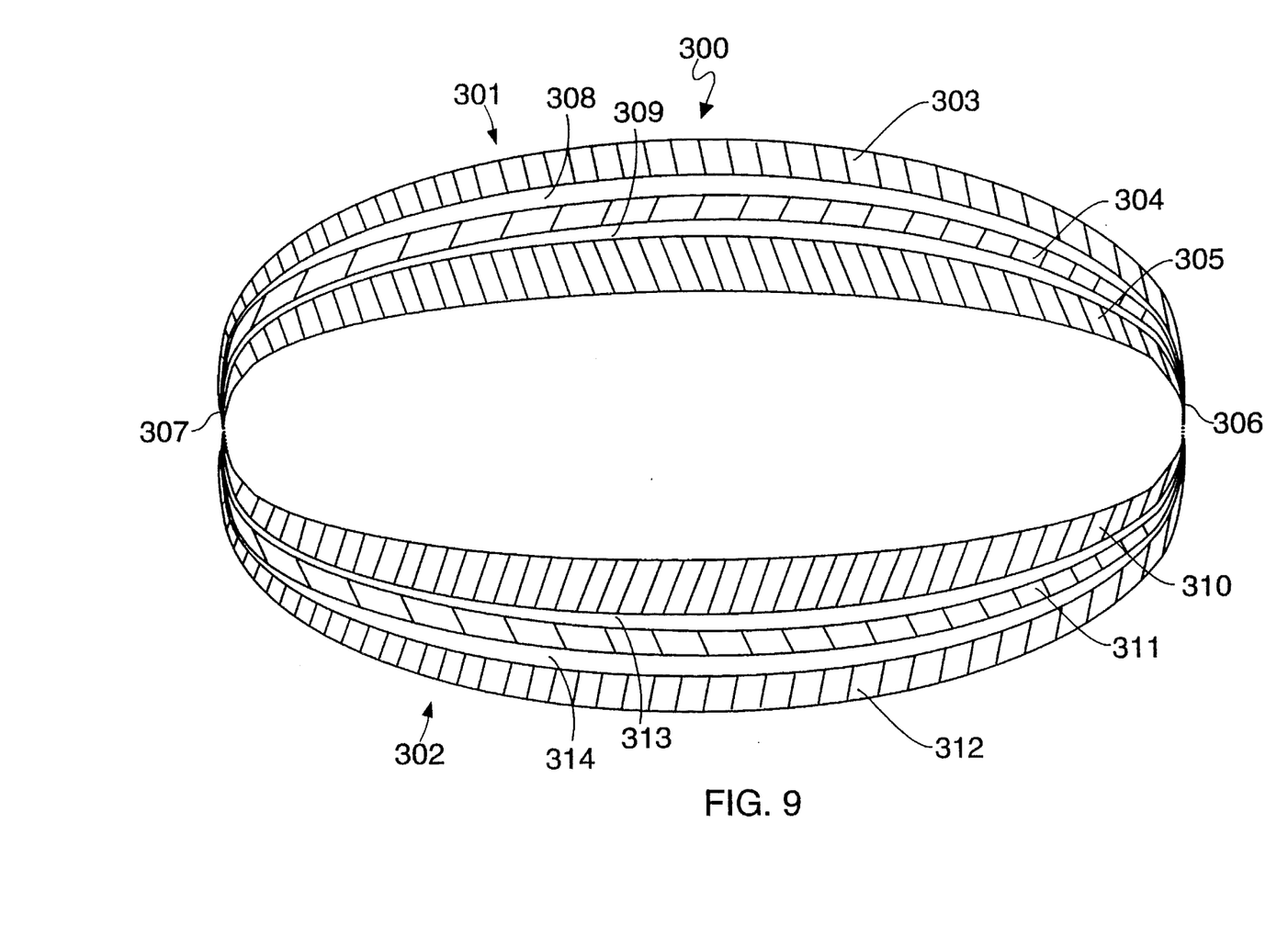
FIG. 9 is a cross-sectional view similar to FIG. 8 of a mitten constructed with non-laminated differential wind barrier materials in accordance with another embodiment of the invention.

Reference is next made to FIG. 9 wherein an alternate type of mitten construction, similar to the construction of FIGS. 7 and 8 is depicted and generally identified as 300. Mitten 300 includes back panel 301 and palm panel 302. Back panel 301 includes fleece layer 303, waterproof and windproof breathable membrane 304 and thick fleece layer 305. In this case, the only seams utilized for holding the layers together are seams 306 and 307 at the periphery of back panel 301. As a result, unbroken, dead air spaces 308 and 309 are formed between layers 303 and 304 and 304 and 305, respectively. The inner or palm panel 302 is formed from a layer of thick fleece 310, waterproof and windproof breathable membrane 311 and fleece layer 312. As a result, unbroken, dead air spaces 313 and 314 are formed between layers 310 and 311 and 311 and 312, respectively. In this way, the back portion of the hand, which is generally exposed to the wind and is protected by the three layer wind blocking sandwich formed of two layers of fleece with a waterproof, windproof membrane layer therebetween. Because flexibility or bending of the hand is generally not necessary in a mitten, the three layer wind blocking sandwich can be used on the inside of the hand. A differential construction where only a single layer of thick fleece is used on the palm may also be used if more flexibility of the hand is required.

A differential type of construction is even more suitable for use in connection with a glove, wherein the back or outer protection of the glove are stitched with a heavy outer fleece layer, a waterproof/windproof membrane and a lighter inner fleece layer while the palm and fourchettes (or gunn, depending upon the construction) have only a single layer of heavy fleece. This gives the hand protection from the elements on the back, which is critical in certain sports such as skiing or biking, at the same time provides a greater degree of flexibility for the action of gripping the ski pole or bicycle handle. Depending upon the requirements of the glove or mitten, the stitching approach allows for the introduction of other layers in the sandwich, such as the addition of a wadding or insulating layers which may be added to one or more parts of the garment in addition to the membrane.

Figure 10:
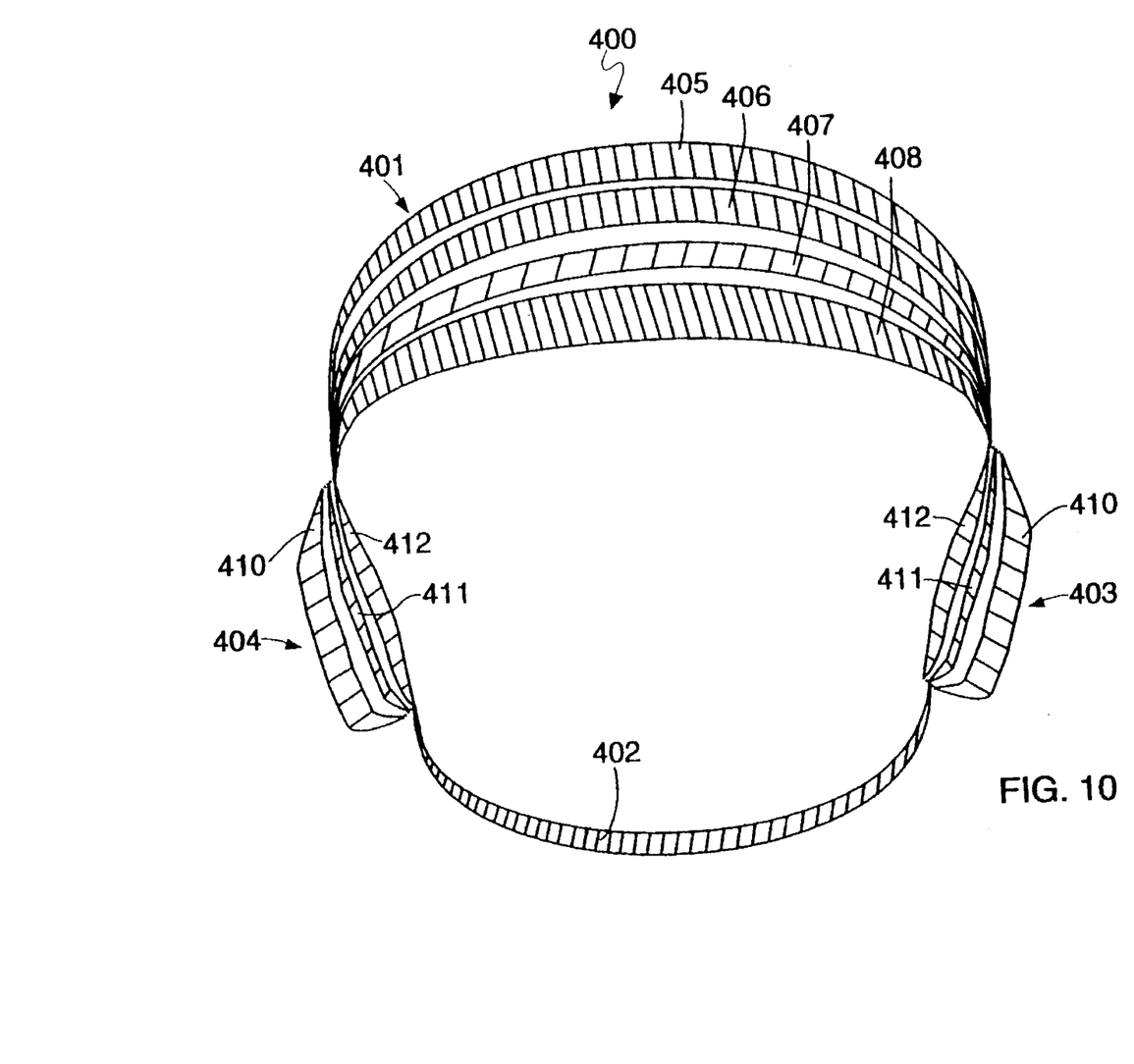
FIG. 10 is a perspective view of a glove with one of the fingers cut off to show a cross-sectional view of the fingers in accordance with a preferred embodiment of the invention.

Reference is next made to FIG. 10 wherein a glove construction generally indicated as 400, similar to that shown in FIG. 2 of the prior art but constructed in accordance with an embodiment of the invention is depicted. FIG. 10 shows the variability of differential layering possible with glove constructions in accordance with the invention. The cut off cross-section of the finger identifies that the finger portion of the glove is formed of four separate strips of material. This includes a back or top panel 401, a bottom or palm portion 402 and two side panels called fourchettes 403 and 404. In the construction depicted, the top back panel is formed of four layers as depicted in the back construction of FIG. 8. The back includes outer, thick fleece layer 405, membrane layer 406, insulation layer 407 and inner fleece layer 408. Palm portion 402 is formed of a single piece of thick fleece. Fourchette pieces 403, 404 are formed of the three layer sandwich, including outer fleece layer 410, membrane layer 411 and inner fleece layer 412. In this way, the portions of the glove required to provide wind protection are augmented while the inner portions of the glove not requiring the same degree of wind protection but, instead, requiring flexibility are achieved. This construction can easily be modified due to the requirements of the construction. It is not necessary for panels to be laminated and then have the laminated portions cut to size and attached.

In fact, each panel of a glove constructed in accordance with conventional glove construction techniques can be customized and optimized for its intended use to improve the degree of wind protection required while maintaining the required flexibility of movement of the hand.

Accordingly, an improved non-laminated differential wind blocking hand covering and non-laminated stitched wind blocking fabric are provided.

It will, thus, be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A wind blocking hand covering comprising:
    a back portion of the hand covering formed of a sandwich of three layers of material, the first layer being an outer fleece layer, the second layer being a waterproof and breathable layer and a third, inner layer;
    sole means in the form of stitching for joining the three layers together along at least one seam.
    a front portion of the hand covering formed of at least one layer of material adapted to cooperatively form a hand covering with the back portion of the hand covering when attached;
    securing means for securing the back portion of the hand covering to the front portion of the hand covering to form a hand covering which is suitable for blocking wind from reaching at least the back portion of a wearer's hand.

2. The wind blocking hand covering of claim 1 wherein the second layer of the back portion is formed of a waterproof and breathable membrane layer.

3. The wind blocking hand covering of claim 1 wherein the stitching means secures the three layers of material together along a single seam forming the periphery of the back portion of the hand.

4. The wind blocking hand covering of claim 3 wherein the stitching means includes at least one additional stitched seam securing the three layers of material together.

5. The wind blocking hand covering of claim 1 wherein the back portion of the hand covering includes a fourth layer of material, the fourth layer being an insulator and the stitching means further secures the fourth layer between the first and third layers.

6. The wind blocking hand covering of claim 5 wherein the fourth layer is secured between the second layer and the third layer.

7. The wind blocking hand covering of claim 1 wherein the hand covering is formed in the shape of a glove and the hand covering further includes finger portion side panels connecting the back portion and front portion of the hand covering.

8. The wind blocking hand covering of claim 7 wherein the side panels are formed of a sandwich of three layers of material, the first layer being an outer fleece layer, the second layer being a waterproof and breathable layer and the third, inner layer wherein the stitching means further joins the three layers of the side panels together along at least one seam.

9. The wind blocking hand covering of claim 8 wherein the back portion of the hand covering includes a fourth layer of material, the fourth layer being an insulator and the stitching means further secures the fourth layer between the first and third layers.

10. The wind blocking hand covering of claim 1 wherein the stitching means includes a series of regularly spaced seams spaced so as to form a series of dead air spaces within the back portion of the hand covering to provide better insulation value and wind blocking performance.

11. The wind blocking hand covering of claim 1 wherein the front portion of the hand covering is formed of a sandwich of three layers of material, a first layer being an outer fleece layer, the second layer being a waterproof and breathable layer and a third inner layer and sole means in the form of stitching for joining the three layers of the front portion of the hand covering together along at least one seam.

12. The wind blocking hand covering of claim 11 wherein the front portion of the hand covering includes a fourth layer of material, the fourth layer being an insulator and the stitching means further secures the fourth layer between the first and third layers.

13. A wind blocking fabric for use in a hand covering, comprising:

a first layer of a fleece material;

a second, intermediate layer of material, the first surface of the second layer being adjacent to the first layer, a second surface of the second layer being on the opposite side of the second layer from the first surface, the second layer being formed of a waterproof, windproof and breathable membrane;

a third layer of material proximate to the second surface of the second layer; and sole binding means for selectively forming a wind resistant fabric from a sandwich of the first layer, second layer and third layer by securing these layers together along selected joined portions of each of the three layers, said binding means extending through each of the three layers;

whereby a wind blocking fabric is formed.

14. The wind blocking fabric of claim 13 wherein the binding means secures the three layers of material together along a single seam forming the periphery of the back portion of the hand.

15. The wind blocking fabric of claim 13 wherein the binding means includes sewn seams securing the three layers together.

16. The wind blocking fabric of claim 15 wherein the binding means secures the three layers together about their periphery.

17. The wind blocking fabric of claim 15 wherein the binding means secures the three layers together in a series of generally parallel seams.

18. The wind blocking fabric of claim 13 further including a fourth layer of insulating material being enclosed between the second surface of the second layer and the third layer, the binding means securing the four layers together along selected joining portions in each of the four layers, said binding means extending through each of the four layers whereby improved wind blocking fabric is formed.

19. The wind blocking fabric of claim 13 wherein the binding means includes sewn seams securing the three layers together with a seam around the periphery of the fabric and a series of generally parallel spaced seams to create a baffled fabric in which dead air spaces are formed within the fabric between the seams to increase the insulating value of the material.

20. A wind blocking garment comprising:

a first panel formed of a sandwich of three layers of material, the first layer being an outer fleece layer, the second layer being a waterproof and breathable layer and a third, inner layer;

sole means in the form of stitching for joining the three layers together along at least one seam;

a second panel formed of at least one layer of material adapted to cooperatively form the garment with the first panel when attached;

securing means for securing the first panel to the second panel to form a garment which is suitable for blocking wind from reaching at least a portion of the wearer's body.

21. The wind blocking garment of claim 20 wherein the second layer of the first panel is formed of a waterproof and breathable membrane layer.

22. The wind blocking garment of claim 20 wherein the stitching means secures the three layers of material together along a single seam forming the periphery of the first panel.

23. The wind blocking garment of claim 22 wherein the stitching means includes at least one additional stitched seam securing the three layers of material together.

24. The wind blocking garment of claim 20 wherein the first panel includes a fourth layer of material, the fourth layer being an insulator and the stitching means further secures the fourth layer between the first and third layers.

25. The wind blocking garment of claim 24 wherein the fourth layer is secured between the second layer and the third layer.

26. The wind blocking garment of claim 20 wherein the stitching means includes a series of regularly spaced seams spaced so as to form a series of dead air spaces within the first panel to provide better insulation value and wind blocking performance.

27. The wind blocking garment of claim 20 wherein the second panel is formed of a sandwich of three layers of material, first layer being an outer fleece layer, the second layer being a waterproof and breathable layer and a third inner layer and sole means in the form of stitching for joining the three layers of the second panel together along at least one seam.

28. The wind blocking garment of claim 27 wherein the second panel includes a fourth layer of material, the fourth layer being an insulator and the stitching means further secures the fourth layer between the first and third layers.

29. A wind blocking fabric for use in a garment comprising:

a first layer of a fleece material;

a second, intermediate layer of material, the first surface of the second layer being adjacent to the first layer, a second surface of the second layer being on the opposite side of the second layer from the first surface, the second layer being formed of a waterproof, windproof and breathable membrane;

a third layer of material proximate to the second surface of the second layer; and sole binding means in the form of stitching for selectively forming a wind resistant fabric from a sandwich of the first layer, second layer and third layer by securing these layers together along selected joined portions of each of the three layers, said binding means extending through each of the three layers;

whereby a wind blocking fabric is formed.

30. The wind blocking fabric of claim 29 wherein the binding means secures the three layers of material together along a single seam forming the periphery of a piece of the fabric suitable to use in the garment.

31. The wind blocking fabric of claim 29 wherein the binding means includes sewn seams securing the three layers together.

32. The wind blocking fabric of claim 31 wherein the binding means secures the three layers together about their periphery.

33. The wind blocking fabric of claim 31 wherein the binding means secures the three layers together in a series of generally parallel seams.

34. The wind blocking fabric of claim 29 further including a fourth layer of insulating material being enclosed between the second surface of the second layer and the third layer, the binding means securing the four layers together along selected joining portions in each of the four layers, said binding means extending through each of the four layers whereby improved wind blocking fabric is formed.

35. The wind blocking fabric of claim 29 wherein the binding means includes sewn seams securing the three layers together with a seam around the periphery of the fabric and a series of generally parallel spaced seams to create a baffled fabric in which dead air spaces are formed within the fabric between the seams to increase the insulating value of the material.

* * * * *